(12) United States Patent
Herzog

(10) Patent No.: US 6,633,480 B1
(45) Date of Patent: Oct. 14, 2003

(54) AIR-COOLED INDUCTION FOIL CAP SEALER

(76) Inventor: Kenneth J. Herzog, 56 Shinnecock Rd., Hampton Bays, NY (US) 11946

(*) Notice: Subject to any disclaimer, the term of this patent is extended or adjusted under 35 U.S.C. 154(b) by 228 days.

(21) Appl. No.: 09/693,032

(22) Filed: Oct. 20, 2000

Related U.S. Application Data

(63) Continuation of application No. 08/966,305, filed on Nov. 7, 1997, now abandoned.
(60) Provisional application No. 60/199,717, filed on Apr. 26, 2000.

(51) Int. Cl.⁷ .............................. H05K 7/20; H05B 6/10
(52) U.S. Cl. ....................................... 361/676; 219/632
(58) Field of Search ................... 361/15, 676; 219/632

(56) References Cited

U.S. PATENT DOCUMENTS

| | | |
|---|---|---|
| 3,477,197 A | 11/1969 | Budz |
| 3,748,422 A | 7/1973 | Schäfer |
| 3,763,342 A | 10/1973 | Oppenheimer |
| 3,946,349 A | 3/1976 | Haldeman, III |
| 4,017,704 A | 4/1977 | Collins, III et al. |
| 4,095,390 A | 6/1978 | Knudsen |
| 4,114,009 A | 9/1978 | Kiuchi et al. |
| 4,122,321 A | 10/1978 | Cachat |
| 4,213,830 A | 7/1980 | Köppl |
| 4,237,360 A | 12/1980 | Pohlenz |
| 4,380,484 A | 4/1983 | Repik et al. |
| 4,488,668 A | 12/1984 | Flaska et al. |
| 4,506,131 A | 3/1985 | Boehm et al. |
| 4,516,104 A | 5/1985 | McDermott |
| 4,704,509 A * | 11/1987 | Hilmersson et al. ..... 219/10.53 |
| 4,707,213 A | 11/1987 | Mohr et al. |
| 4,757,175 A | 7/1988 | Mohr et al. |
| 4,819,414 A | 4/1989 | Worden et al. |
| 4,825,625 A | 5/1989 | Hufford |
| 4,845,332 A | 7/1989 | Jancosek et al. |
| 4,853,510 A | 8/1989 | Mohr et al. |
| 4,891,484 A | 1/1990 | Waggott et al. |
| 4,899,025 A | 2/1990 | Kamp et al. |
| 5,022,531 A | 6/1991 | Horino et al. |
| 5,034,586 A | 7/1991 | Havas et al. |
| 5,059,762 A | 10/1991 | Simcock |
| 5,101,086 A | 3/1992 | Dion et al. |
| 5,109,653 A | 5/1992 | Kubis et al. |
| 5,230,427 A | 7/1993 | Betts et al. |

(List continued on next page.)

FOREIGN PATENT DOCUMENTS

| | | |
|---|---|---|
| DE | 4213830 | 11/1993 |
| EP | 0408230 | 1/1991 |
| WO | 97/22523 | 6/1997 |

OTHER PUBLICATIONS

Product Brochure, Lepel Cap Sealing, Product Selection Guide. No publication date avaiable.

Product Brochure, Pillar Foiler Capsealing System, Pillar Technologies Ltd. Partnership. No publication date available.

"Coil Design Holds Key To Improving Induction Cap Sealing Efficiency," Ronald F. May, Journal of Packaging Technology Jan./Feb. 1991.

*Primary Examiner*—Adolf D. Berhane
(74) *Attorney, Agent, or Firm*—Ostrolenk, Faber, Gerb & Soffen, LLP

(57) ABSTRACT

An induction foil cap sealing system includes a ferrite core having a plurality of openings therethrough and a mounting plate with a plurality of openings therethrough which are aligned with the plurality of openings in the ferrite core. Air is directed to flow through the openings to draw heat away. A litz wire coil is disposed proximate to the ferrite core which produces an electromagnetic field within the ferrite core. The ferrite core and litz wire coil are adapted to direct the electromagnetic field toward abject to heat it.

15 Claims, 5 Drawing Sheets

U.S. PATENT DOCUMENTS

| | | |
|---|---|---|
| 5,321,934 A | 6/1994 | Bech |
| 5,349,167 A | 9/1994 | Simcock |
| 5,381,913 A | 1/1995 | Peeters |
| 5,397,877 A | 3/1995 | Couffet et al. |
| 5,430,273 A | 7/1995 | Bogdanski et al. |
| 5,444,963 A | 8/1995 | Steingroever et al. |
| 5,461,215 A | 10/1995 | Haldeman |
| 5,513,781 A | 5/1996 | Ullrich et al. |
| 5,523,546 A | 6/1996 | Lake |
| 5,746,872 A * | 5/1998 | Spatafora et al. ......... 156/274.2 |
| 5,822,669 A | 10/1998 | Okabayashi et al. |
| 5,847,370 A | 12/1998 | Sluka et al. |
| 5,848,319 A | 12/1998 | Morigami et al. |
| 6,035,607 A | 3/2000 | Miller |
| 6,043,471 A | 3/2000 | Wiseman et al. |
| 6,078,033 A | 6/2000 | Bowers et al. |
| 6,412,252 B1 * | 7/2002 | Sarles et al. ............... 53/329.2 |

* cited by examiner

US 6,633,480 B1

AIR-COOLED INDUCTION FOIL CAP SEALER

This application is based on and claims priority to U.S. Provisional Patent Application Ser. No. 60/199,717, filed Apr. 26, 2000, entitled "Induction Foil Cap Sealer" which is related to patent application Ser. No. 09/138,159, filed Aug. 21, 1998, entitled "Induction Foil Cap Sealer" which is a continuation of patent application Ser. No. 08/966,305, filed Nov. 7, 1997, now abandoned, which is related to patent application Ser. No. 60/030,488, filed Nov. 15, 1996, now abandoned, the entire contents of all are incorporated herein by reference.

BACKGROUND OF THE INVENTION

1. Field of the Invention

The present invention relates to an induction sealing apparatus which seals a foil sheet or liner to the opening of a container and, more particularly, to an induction sealing apparatus which is air cooled and which does not require the use of thermally conductive material disposed within ferrite cores of the apparatus to facilitate heat removal.

2. Related Art

Induction sealing units for sealing and hermetically sealing or tamper-proof sealing containers with foil liners are typically included in conveyer systems for high volume applications. A discussion of the general principles of inductive sealing is disclosed in pending application Ser. No. 09/138,159, the entire contents of which is incorporated by reference.

Conventional systems comprise an induction head which includes ferrite materials arranged to channel and direct the electromagnetic field towards the foil liner. An electric current is induced in the foil liner which heats the foil to a temperature sufficient to bond the foil to the rim of the container. As the foil and rim cool, the foil is firmly joined to the rim providing a securely sealed container.

Induction sealing systems generate a significant amount of excess thermal energy and have to be cooled in some way. Some systems use water cooling while others circulate air across heat sinks to draw heat away from the core.

In air cooled systems, a thermally conductive material is disposed within the ferrite core in order to conduct the heat generated within the core to heat sinks which are used to transfer the thermal energy to the air used to cool the unit. This thermally conductive material adds to the cost and weight of the device and is subject to mechanical failure and cracking. Heat sinks are usually made of metal and are produced with a plurality of fin projections to help dissipate the excess heat produced within the ferrite core. Exposed fins are subject to breakage which reduces the effectiveness of the heatsinks. Also, the use of extensive heatsinks add to the complexity and weight of the device.

Water cooled systems are necessarily more complicated and more costly. Water cooled systems require plumbing and a pumping system to circulate the water throughout the induction sealing head.

SUMMARY OF THE INVENTION

Accordingly, the present invention provides an induction sealing unit which does not require thermally conductive materials disposed within the ferrite core and is thus less expensive to produce than the prior art.

The present invention also provides an induction sealing head which utilizes an air cooled slotted ferrite core to minimize the use of complex heat sink configurations.

The present invention also provides an induction sealing head which is more energy efficient than conventional induction sealers.

The present invention also provides an induction sealing unit that is easy to use, manufacture and maintain.

The present invention attains these features by providing a sealing unit having a horizontal mounting plate, a ferrite core having openings formed therethrough, disposed on the mounting plate and a litz wire coil disposed proximate to the ferrite core for producing an electromagnetic field. The ferrite core and litz wire coil are adapted to direct an electromagnetic field toward a foil used to seal an opening of a container. The horizontal mounting plate has openings coinciding with the openings within the ferrite core to provide air flow through and around the core and sealing head.

Other features and advantages of the present invention will become apparent from the following description of the invention which refer to the accompanying drawings.

BRIEF DESCRIPTION OF THE DRAWINGS

For the purpose of illustrating the invention, there are shown in the drawings an embodiment which is presently preferred, it being understood, however, that the invention is not limited to the precise arrangement and instrumentality shown.

DETAILED DESCRIPTION OF THE PREFERRED EMBODIMENT

Figure 1:
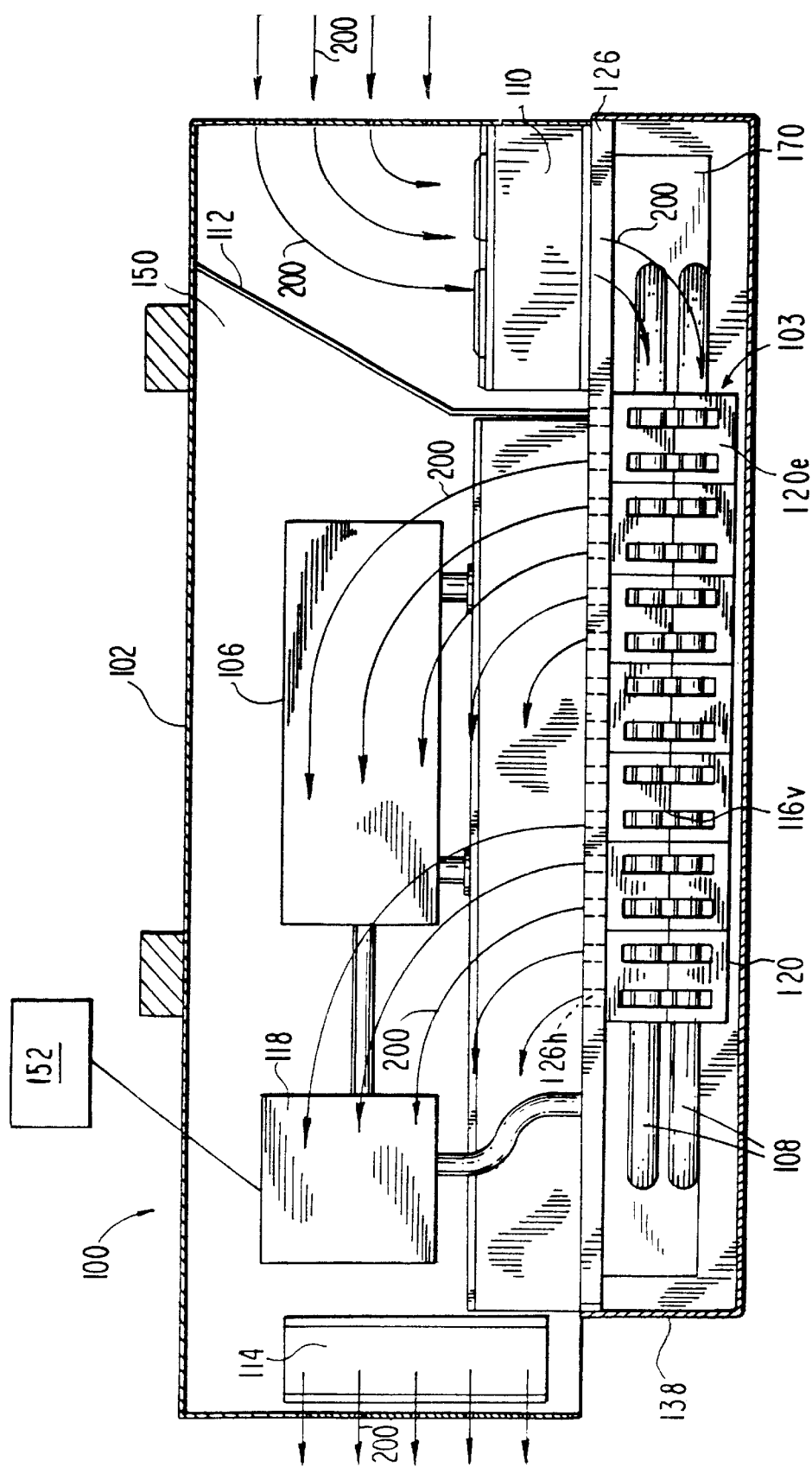
FIG. 1 shows a front view of an induction sealing conveyor system employing an air cooled sealing head which is constructed in accordance with the principles of the present invention.

Referring now to the drawings wherein like numerals indicate like elements, there is shown in FIG. 1 an induction sealing unit designated generally as 100. Sealing unit 100 comprises housing 102 and sealing head 103. The components within housing 102 include capacitor 106, intake fan 110, outtake fan 114, transformer 118 electrically connected to the capacitor 106 and a power supply 152 electrically connected to transformer 118. Sealing head 103 comprises a horizontal mounting plate 126, two vertical mounting plates 170 (only one of which can be seen in FIG. 1), a ferrite core 120 and a litz wire coil 108 electrically connected to transformer 118.

Figure 4:
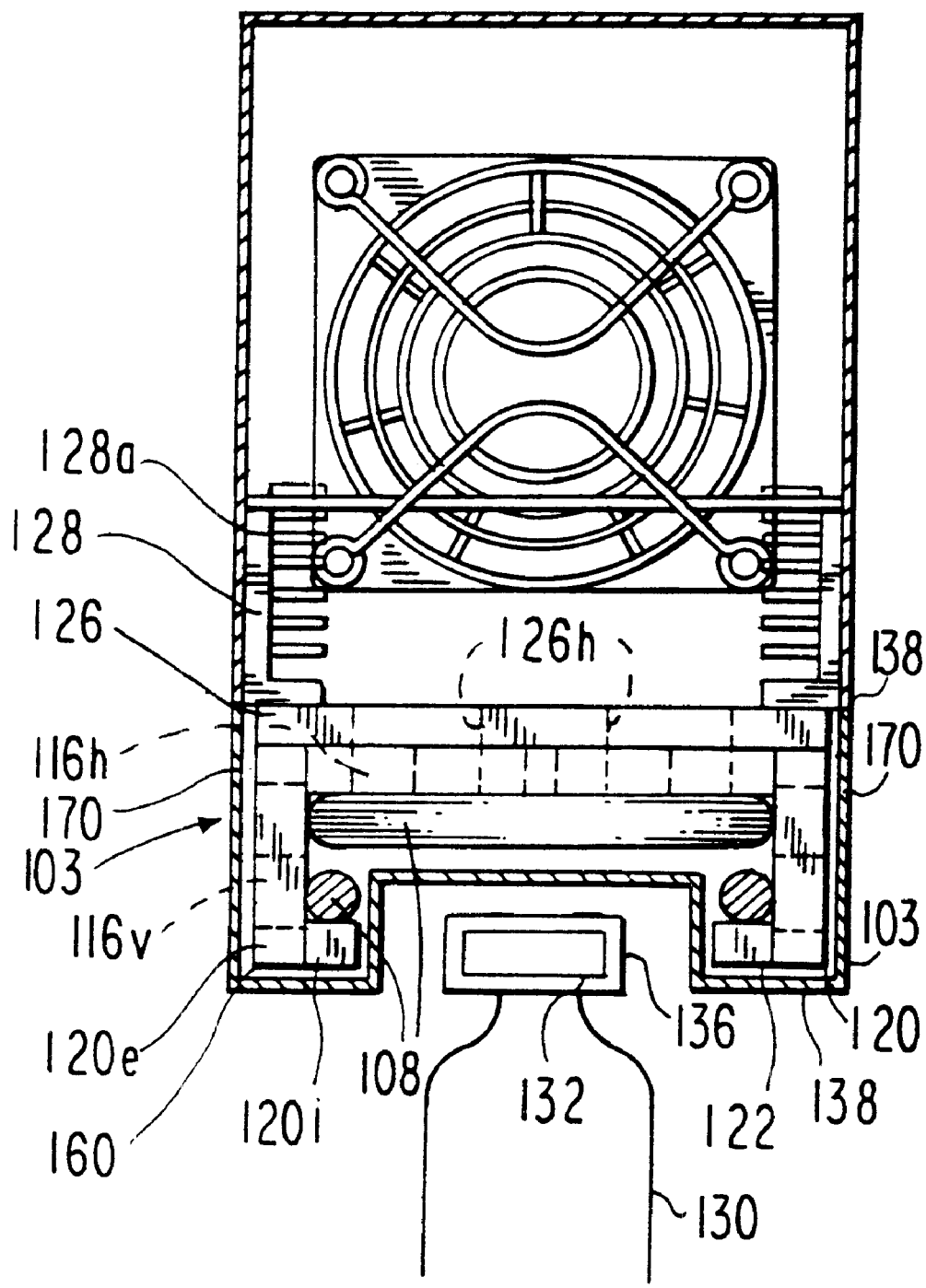
FIG. 4 is a side view of the sealing head of the present invention.
Figure 5:
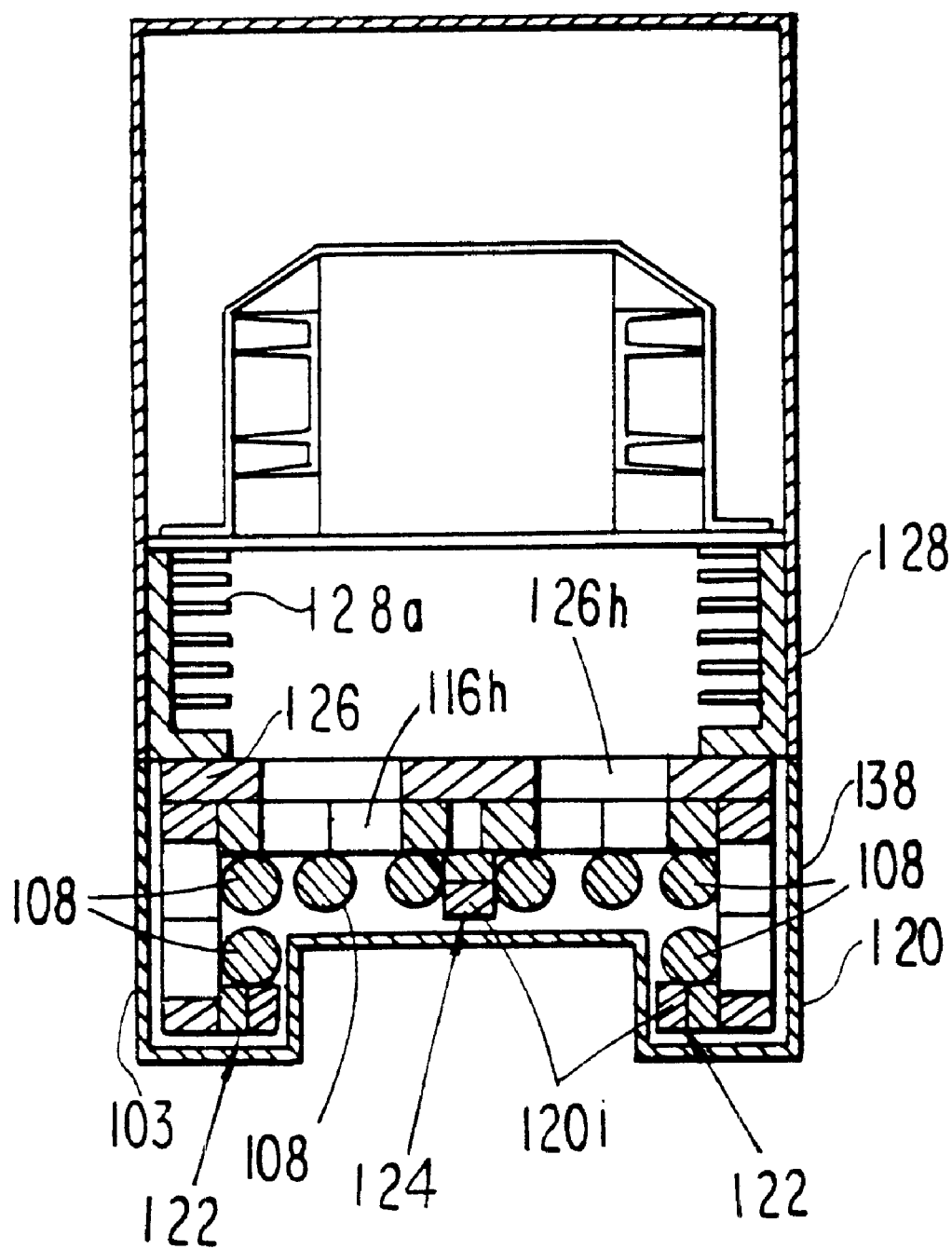
FIG. 5 is a sectional view along section lines 5—5 of FIG. 2.

Referring to FIGS. 4 and 5, ferrite core 120 is constructed from both "E"-shaped and "I"-shaped ferrites (120e and 120i respectively) to form a channel shape which includes bottom tab sections 122 and a center spine 124. Center spine 124 is constructed of the "I"-shaped ferrites 120i bonded together and centrally aligned along the longitudinal axis (i.e. the axis extending from the left to the right sides of ferrite core 120 as shown in FIG. 1) of ferrite core 120.

Referring now to FIG. 1, a plurality of the "E"-shaped ferrites 120e are joined open end to open end to form slots 116v which are aligned perpendicular to the longitudinal axis of ferrite core 120. Slots 116v are vertically oriented along the two outer portions of ferrite core 120.

Figure 2:
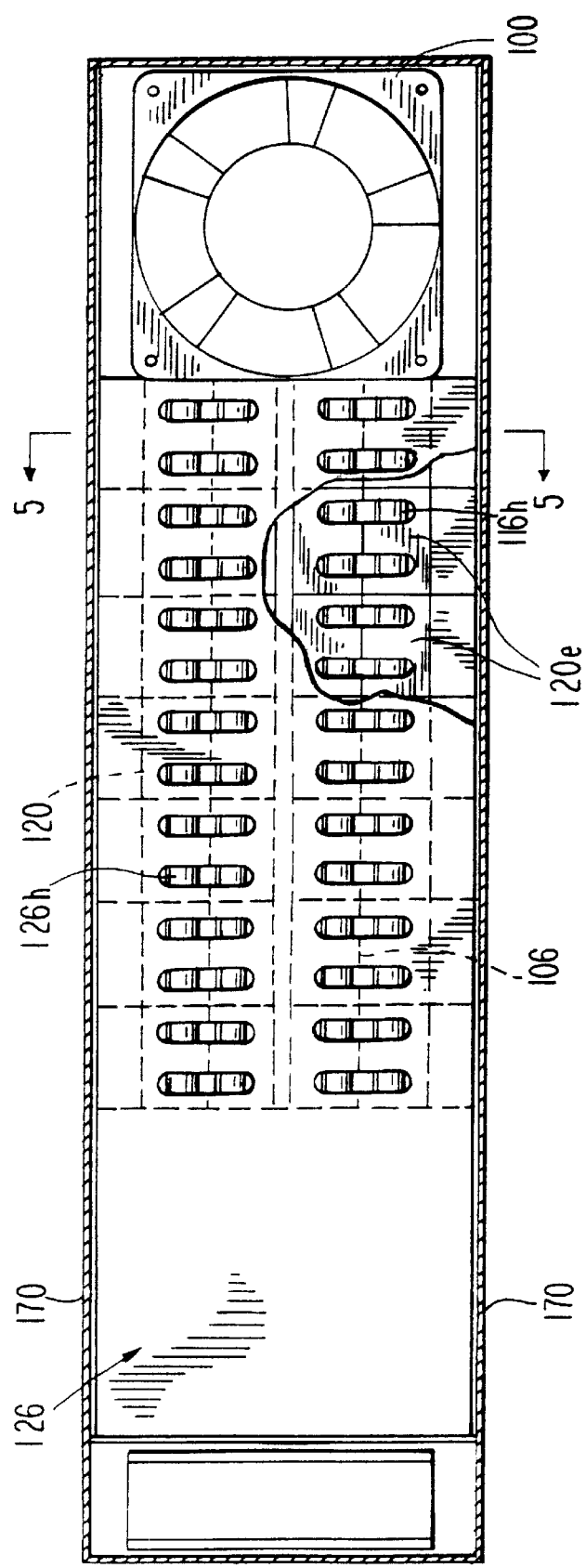
FIG. 2 is a top view showing slots in a metallic plate used in the sealing head of the present invention.

Now referring to FIGS. 1 and 2, another plurality of the "E"-shaped ferrites 120e are also arranged open side to open side to form horizontal slots 116h. Slots 116h are horizontally oriented and are aligned perpendicular to the longitudinal axis. Slots 116h provide air channels within ferrite core 120 and increase the surface area exposed to cooling air 200, thereby allowing ferrite core 120 to be air cooled without the use of thermally conductive materials encasing ferrite core 120.

In order to direct the electromagnetic field within core 120, a conductor needs to be in intimate contact with the core, but the conductor must be electrically insulated from core 120. Induction sealing unit 100 utilizes high frequency current which tends to flow near the surface of a conductor (known as "the skin effect"). Therefore, the conductor needs to be one suited for use with high frequencies. It is for this reason that the litz wire coil 108 is used as the conductor.

Preferably, litz wire coil 108 includes thousands of individually insulated electrical conductors surrounded by an insulating sheath, made from polyethylene, polypropylene, Teflon, or the like, which also electrically insulates litz wire coil 108 from the surrounding structures, including ferrite core 120.

Litz wire coil 108 has a very low resistance to the flow of current as compared to the wire typically used in conventional induction sealers. This lower resistance allows the current to flow more efficiently and requires less power to operate. Litz wire coil 108 also generates less heat than the wire typically used, thereby making it easier to cool.

Litz wire coil 108 is sized such that the effective resistance per unit length is only about 0.1 to 0.01 of the resistance per unit length of the wire typically used in conventional induction sealers. Consequently, the heat produced within litz wire coil 108 (due to $I^2R$ losses) is reduced by a factor somewhere between 10–100 times allowing induction sealing unit 10 to be air cooled rather than liquid cooled.

Figure 3:
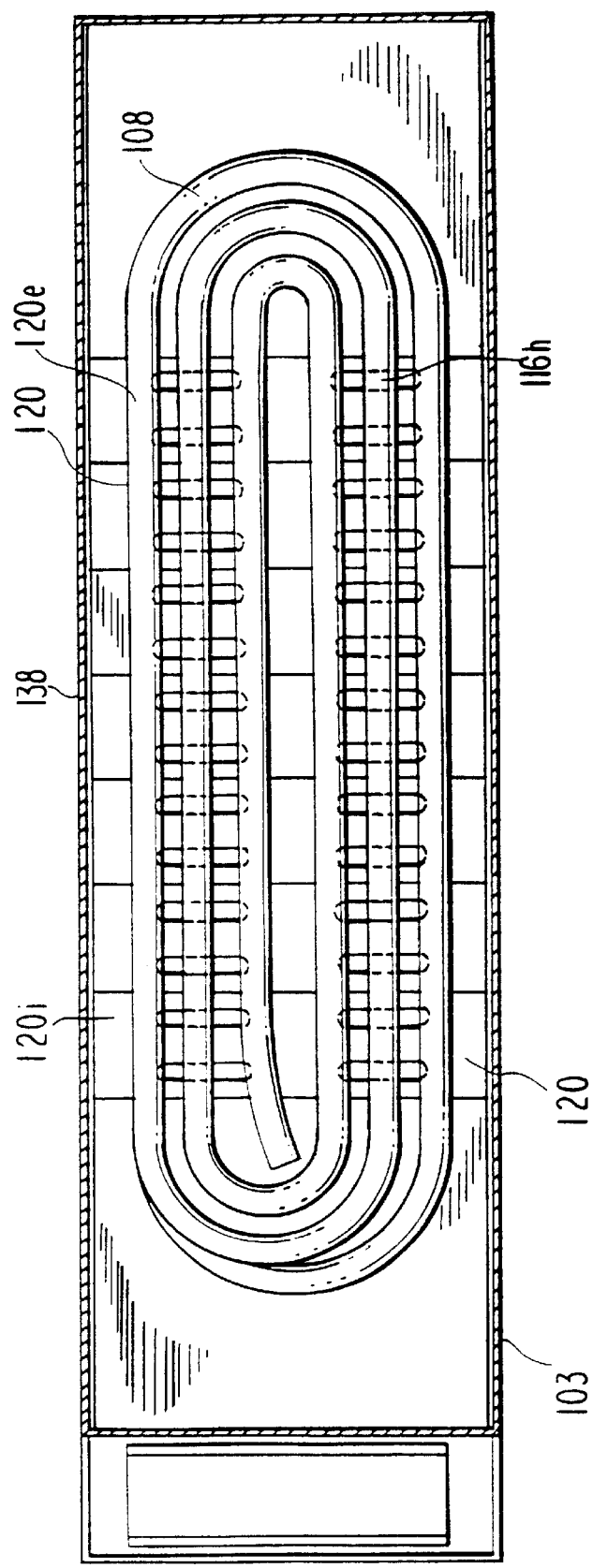
FIG. 3 is a bottom view of the sealing head used in present invention showing the litz wires and the slots.

Referring to FIGS. 3 and 4, litz wire coil 108 is attached so as to abut against the inner surface of ferrite core 120. Litz wire coil 108 may be attached to ferrite core 120 with a heat resistant epoxy or by using temperature resistant strapping materials. Whatever method is used to attach litz wire coil 108, it is important that litz wire coils 108 remain flush against the inner surface of ferrite core 120.

Referring again to FIGS. 1 and 2, horizontal mounting plate 126, which is formed from a metal with good thermal conductivity such as aluminum, supports ferrite core 120. Cooling slots 126h are aligned with cooling slots 116h that are formed within ferrites core 120. Slots 16h are aligned with respective slots 126h to provide cooling channels in ferrite core 120 through which cooling air 200 is circulated.

A first plurality of individual ferrites 120e are horizontally positioned and epoxied to the lower surface of horizontal mounting plate 126. Horizontal mounting plate 126 is either unitarily formed with two vertical mounting plates 170 or alternatively, the two vertical mounting plates 170 can be attached to horizontal mounting plate 126. Any method of attachment is acceptable as long as the joint can withstand thermal stress (i.e. welding, bolting, gluing, etc.) Another plurality of individual ferrites 120e are vertically mounted and epoxied along the inner surface of mounting plates 170. The vertical slots 116v formed in ferrite core 120 increase the surface area of the ferrite core 120 exposed to cooling air flow 200, but it is not necessary for air to flow through the vertical slots 116v. However, it would be within the scope of this disclosure to cut slots corresponding to vertical slots 116v in the vertical mounting plates 170 to provide an airflow channel through the sides of ferrite core 120 if additional cooling is desirable.

Referring to FIGS. 1 and 4, heat is drawn from the vertically mounted ferrites 120e using a heat sink 128 which is in intimate contact along the outer longitudinal edges of mounting plates 126 and 170. A plurality of fins 128a are inwardly exposed to cooling air flow 200 to draw heat away from the sides of ferrite core 120.

Cooling air 200 is directed to flow within ferrite core 120 by an air circulation chamber 150 which is defined within housing 102. Cooling air flow 200 is drawn in through intake fan 110. A baffle 112 is mounted at an angle within air circulation chamber 150 to direct cooling air 200 down through horizontally mounted intake fan 110. Air is then pushed through cooling slots (116h and 126h) thereby cooling core 120, and also cooling components such as capacitor 106 and transformer 118. Cooling air 200 also draws heat away from heat sink 128. Cooling air is simultaneously pulled with vertically mounted outtake fan 114.

Protective boot 138 encloses the bottom of sealing head 103 to protect litz wire coil 108 and ferrite core 120. Protective boot 138 also directs air flow 200 to flow within ferrite core 120. Fans 110 and 114 are preferably capable of moving approximately 100 cubic feet of air per minute.

In operation, referring to FIG. 4, a container 130 having a foil liner 132 passes beneath sealing head 103. As the container. 130 passes beneath sealing head 103, a circuit including the power supply 152, the transformer 118, the capacitor 106 and the litz wire coil 108 cause a current to be induced in foil liner 132 heating and fusing it to the container 130. A cap 136 can be used to position and press foil liner 132 against the top of container 130.

Air is directed through slots (116h and 126h) formed within the ferrite core 120 to advantageously eliminate the need for thermally conductive materials disposed therein. This lowers the cost of producing the unit as well as reducing production time and overall weight of the unit.

Because air is channeled within the core 120 itself, through slots 116h and 126h, operating temperatures can be easily controlled, thereby increasing the efficiency of the unit. Heat does not build up within the core 120 and even in the event of a power failure, air will naturally circulate through the core 120, allowing some cooling to take place by convection. Units using thermally conductive materials disposed within the ferrite cores, store up more heat when deprived of a cooling air flow within the housing. The mounting plates (126 and 170) and heat sink 128 can be made of any thermally conductive metal, but aluminum is particularly well suited since it is lightweight, easily machined, relatively, inexpensive and conducts heat quite effectively, i.e., has a relatively high co-efficient of thermal conductivity.

The slots 126h in mounting plate 126 are shown as oblong in shape, but any shaped opening can be utilized as long as an air channel is formed allowing the air to circulate within ferrite core 120.

The foregoing description of the preferred embodiment of the invention has been presented for the purposes of illustration and description. It is not intended to be exhaustive or to limit the invention to the precise form disclosed. Many modifications and variations are possible in light of the above teaching.

What is claimed is:

1. An induction sealing unit comprising:

a ferrite core;

the ferrite core having a plurality of core openings therethrough structured and arranged to allow a cooling gas to flow through the ferrite core; and a conductive coil disposed proximate to the ferrite core structured and arranged to direct an electromagnetic field towards an object to be heated.

2. The induction seal in unit of claim 1, wherein said conductive coil is a litz wire coil.

3. The induction sealing unit of claim 1, further comprising a housing;

the housing substantially covering an upper portion of the ferrite core.

4. The induction sealing unit of claim 3, further comprising:

at least one cooling fan disposed in the housing;

the at least one cooling fan being directed to circulate a cooling gas through the plurality of core openings within the ferrite core.

5. The induction sealing unit of claim 4, wherein the cooling gas is air.

6. The induction sealing unit of claim 5, further comprising a heatsink operably coupled to the ferrite core for drawing heat away from the ferrite core.

7. The induction sealing unit of claim 6, wherein the at least one cooling fan also directs the cooling gas across the heatsink.

8. The induction sealing unit of claim 3, further comprising:

at least one intake fan disposed in the housing;

at least one outtake fan disposed in the housing; and the at least one intake fan and the at least one outtake fan structured and arranged within the housing to cooperatively circulate a cooling gas through the plurality of core opening within the ferrite core.

9. The induction sealing unit of claim 1, wherein the ferrite core includes individual ferrite elements.

10. The induction sealing unit of claim 9, wherein the individual ferrite elements include E-shaped ferrite elements structured and arranged with an open end of the E-shaped ferrite element facing another open end of another E-shaped ferrite element, thereby forming the plurality of core openings.

11. An induction sealing unit of claim 1, further comprising a cover the cover substantially covering a downwardly projecting portion of the ferrite core 12.

12. The induction sealing unit of claim 2, further comprising:

an energizing assembly including at least:

the litz wire coil;

a capacitor electrically connected to the litz wire coil and a transformer; and a power supply electrically coupled to the transformer.

13. The induction sealing unit of claim 9, further comprising:

a mounting plate;

the individual ferrite elements being attached to the mounting plate; and the mounting plate having a plurality of plate openings therethrough, aligned with the core openings of the ferrite core openings to allow a cooling gas to circulate through the unit.

14. An induction sealing unit comprising:

a mounting plate having a plurality of plate openings therethrough;

a ferrite core having a plurality of core openings therethrough, and mounted to the mounting plate such that the plurality of plate openings and the core openings to coincide with each other to allow a cooling gas to flow through the ferrite core; and a litz wire coil disposed proximate to the ferrite core structured and arranged to direct an electromagnetic field towards an object to be heated.

15. An induction sealing unit comprising:

a housing;

a mounting plate having a plurality of plate openings therethrough and attached to the housing;

a ferrite core having a plurality of core openings therethrough and mounted to the mounting plate such that the plurality of plate openings and the core openings coincide with each other to allow a cooling gas to flow through the ferrite core;

a litz wire coil disposed proximate to the ferrite core structured and arranged to direct an electromagnetic field towards an object to be heated;

at least one cooling fan disposed in the housing; and the at least one cooling fan being directed to circulate a cooling gas through the plurality of core openings within the ferrite core.

* * * * *